United States Patent [19]
Kohler

[11] Patent Number: 5,152,571
[45] Date of Patent: Oct. 6, 1992

[54] MOUNTING DEVICE FOR PORTABLE SEAT

[76] Inventor: David J. Kohler, 607 Maine Ave, Adrian, Minn. 56110

[21] Appl. No.: 760,186

[22] Filed: Sep. 16, 1991

[51] Int. Cl.⁵ .............................................. B60N 1/00
[52] U.S. Cl. ................................. 296/65.1; 248/503.1
[58] Field of Search ............................ 296/630, 65.1; 248/503.1, 501; 297/15

[56] References Cited

U.S. PATENT DOCUMENTS

| | | | |
|---|---|---|---|
| 4,325,446 | 4/1982 | Hicks | 296/63 X |
| 4,638,546 | 1/1987 | Benshoof | 296/63 X |
| 4,805,952 | 2/1989 | Coleman | 296/65.1 |
| 4,971,379 | 11/1990 | Rumpel et al. | 296/63 |
| 4,978,158 | 12/1990 | Kubo et al. | 296/65.1 |

Primary Examiner—Robert R. Song

[57] ABSTRACT

A mounting device for a seat usable in a boat or other conveyance. The mounting is readily separable so that even though one part is firmly fastened to the conveyance and a second part to the seat, the seat is readily detached and removed from the conveyance. The ready detachability is accomplished with a relatively simple latch built into the mounting.

4 Claims, 2 Drawing Sheets

MOUNTING DEVICE FOR PORTABLE SEAT

BACKGROUND AND SUMMARY OF THE INVENTION

This invention pertains to devices adapted to fasten a seat to a conveyance and more particularly to such a device which will allow easy removal of the seat by a simple unlatching of the attachment means.

In many installations it may be desired to be able to readily remove seats. Such installations may include fishing boats, automobile vans and the like. In such installations currently, the seat may be fastened to a floor by a few bolts, may be set into a socket or use similar fastenings.

By my invention, I provide an attachment device where, by using a simple latch requiring only lateral movement of one part of the latch, the seat can be fully removed leaving only a pair of narrow flanges extending from the floor on which the seat is mounted. For a normal installation, the problem of rusted bolts and the like is completely avoided.

DESCRIPTION

Figure 1:
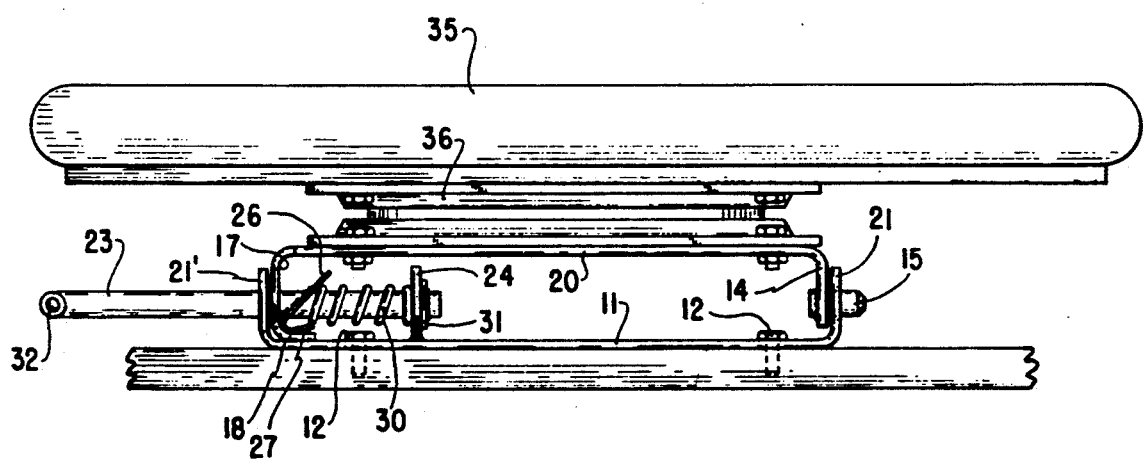
FIG. 1 is an elevational view of an installation of the mounting device and its attached seat.
Figure 5:
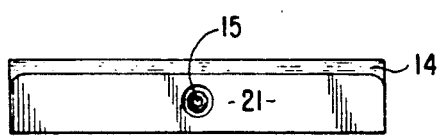
FIG. 5 is an elevational view of the mounting from the end opposite that shown in FIG. 4.

Briefly my invention comprises a mounting device for removably attaching a seat such as a chair to a vehicle such as a boat so that removal of the seat is convenient and quick.

More specifically, the attachment device is adapted to be fastened to the deck 10 of a boat or to a floor or other part of a van or other vehicle. The device includes a lower plate 11 which may be fixed by screws or bolts 12 or other means to the deck.

An upper plate 20 is formed with flanges at opposite ends of the plate. A dowel flange 14, at one end, is the support for a dowel 15 forming a peg extending beyond the plate 20. The opposite or slide flange 17 is at the opposite end of the plate and may include a turned edge 18 to stiffen the flange and to allow easier assembly of the device as will appear. This edge 18 or lip is also used to provide a lip against which the device will latch.

The lower plate 11 also includes a pair of flanges 21 and 21' adapted to embrace the flanges 14 and 17 is provided. The first flange 21 is formed with an opening through which the dowel 15 will project, thus anchoring that end of the upper plate 20 relative to the lower plate 11 when the peg 15 is engaged. At the opposite end of the plate 11, the flange 21' carries a sliding bar or tube 23, slidable through a hole formed in the flange 21' and through a corresponding hole in a projecting ear 24 extending upward from the lower plate 11.

Figure 6:
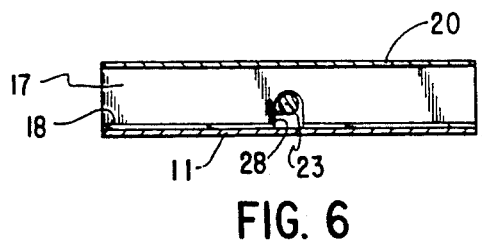
FIG. 6 is a sectional view from line 6—6 of FIG. 3.
Figure 3:
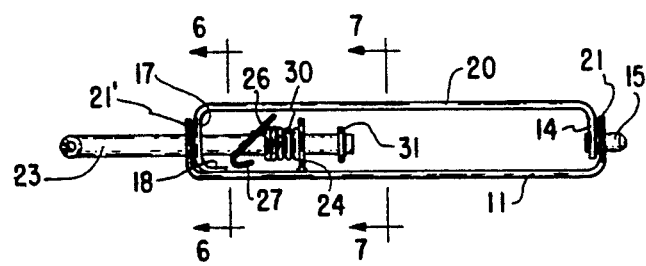
FIG. 3 is an elevational view of the mounting separate from the seat and showing the latch in position for detachment.
Figure 4:
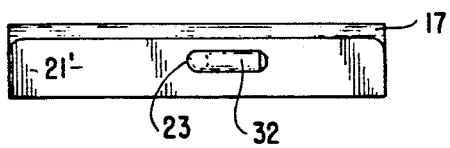
FIG. 4 is an end elevational view of the device of FIG. 2.
Figure 2:
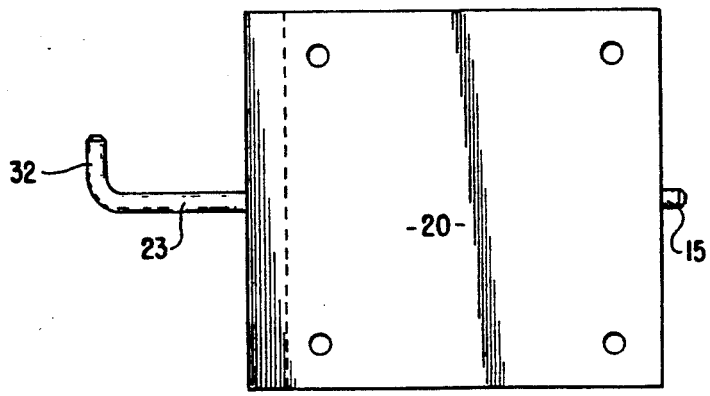
FIG. 2 is a top plan view of the mounting separated from the seat.
Figure 7:
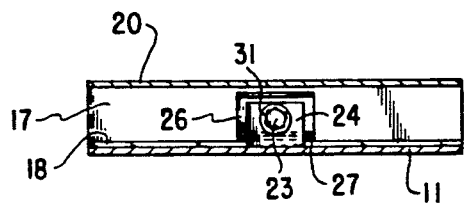
FIG. 7 is a sectional view from line 7—7 of FIG. 3.

A latch plate 26 preferably having a curved lower end 27 is fixed to the slide 23 in position to be carried from a latched position shown in FIG. 1 in which the end 27 is engaged with the edge 18 to an unlatched position shown in FIG. 3. In this latter position, the end 27 and the rest of the latch plate are completely free of the edge 18. The flange 17 is formed with a slot 28 (FIG 6) so that the slide 23 can be moved vertically through the flange 17 allowing the plates 11 and 20 to be disengaged and separated by raising the upper plate and pulling the dowel 15 from its hole in the flange 14 at which time the entire upper plate together with any attachments is completely free to be moved. It should be noted that the latch plate 26 is wide enough to completely straddle the slot 28 and thus engage the edge 18 on both sides of the slot 28.

The slide 23 is biassed to the latched position by a compression spring 30 engaged between the latch plate 26 and the ear 24. A washer 31 may be fixed to the end of the slide 23 to limit the movement of the slide 23. The washer may be welded to the slide 23, or preferably held in place by a split washer on the slide or a nut threaded thereon. The slide should also be provided with an end suitable to be pressed by hand. I show an L-shaped bend having an extension 32. However, it will be obvious that any type of knob or bumper could be used in order to avoid the discomfort of a highly localized pressure on the hand as the slide is pushed to the unlatched position.

The seat 35 may be attached to the upper plate 20 by any customary means. I have illustrated a swivel base 36 as may be useful in a boat. However, a pedestal or any other type of support could be used.

I claim as my invention;

1. For mounting a seat releasably on a vehicle floor, a mounting device comprising two plates, a first of said plates having a pair of flanges at opposite ends thereof, the second plate also having a pair of flanges at opposite ends, the flanges on said second plate being spaced to be outwardly of but in close contact with said flanges on said first plate, each of said flanges on said first plate thus being associated with a flange on said second plate, a dowel attached to one of said flanges on said first plate, the associated flange on said second plate being formed with a hole embracing said dowel and thereby positioned to hold said second plate relative to said first plate, latching means mounted on said second plate adapted to releasably engage said flange on said first plate opposite to the flange engaged by said dowel whereby said latching means when engaged holds the associated flanges, release of said latching means being effective to release said associated flanges making possible release of said dowel from its embracing hole to allow the flanges associated with the dowel and hole also to be released wherein one of said first and second plate is attached to the seat and the other of said first and second plate is attached to the vehicle floor.

2. The mounting device of claim 1 in which the flange on said first plate opposite said dowel is formed with a turned edge, said latching means being attached to the flange on said second plate opposite to said flange formed with the hole embracing the dowel, said latching means including a push rod, a latch plate fixed on said push rod, said latch plate being adapted to engage said turned edge in latched relation, said push rod being slidable to disengage said latch plate from said turned edge to release the engagement.

3. The mounting device of claim 2 in which an ear extends from said lower plate substantially parallel to said flanges and spaced therefrom, said push rod being slidable in one of said flanges and said ear, said latch plate being mounted on said push rod between said ear and said one flange in which said rod is slidable.

4. The mounting device of claim 3 in which bias means is engaged between said ear and said latch plate whereby said latch plate is biassed toward its latched position in engagement with said turned edge.

* * * * *